(12) United States Patent
Song et al.

(10) Patent No.: US 9,107,234 B2
(45) Date of Patent: Aug. 11, 2015

(54) APPARATUS AND METHOD FOR SCHEDULING IN A BROADBAND RADIO COMMUNICATION SYSTEM

(75) Inventors: Kuk-Jin Song, Yongin (KR); Seung-Hyun Lee, Seoul (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 242 days.

(21) Appl. No.: 13/142,773

(22) PCT Filed: Dec. 24, 2009

(86) PCT No.: PCT/KR2009/007787
§ 371 (c)(1),
(2), (4) Date: Jun. 29, 2011

(87) PCT Pub. No.: WO2010/077023
PCT Pub. Date: Jul. 8, 2010

(65) Prior Publication Data
US 2011/0268069 A1    Nov. 3, 2011

(30) Foreign Application Priority Data

Dec. 31, 2008 (KR) .................. 10-2008-0138901
Feb. 6, 2009 (KR) .................. 10-2009-0009939

(51) Int. Cl.
*H04W 4/00* (2009.01)
*H04W 72/12* (2009.01)
(Continued)

(52) U.S. Cl.
CPC ........ *H04W 72/1231* (2013.01); *H04W 52/146* (2013.01); *H04W 52/228* (2013.01); *H04W 52/262* (2013.01); *H04W 72/1289* (2013.01)

(58) Field of Classification Search
CPC . H04W 52/22; H04W 52/221; H04W 52/226; H04W 52/146; H04W 52/343; H04W 52/346; H04W 52/228; H04W 72/1231; H04W 72/1289

USPC ........ 370/322, 329, 332, 348, 443, 208, 311, 370/432, 252

See application file for complete search history.

(56) References Cited

U.S. PATENT DOCUMENTS

| 8,532,038 B2 * | 9/2013 | Jones et al. ............ 370/329 |
| 2005/0286408 A1 * | 12/2005 | Jin et al. ............ 370/208 |

(Continued)

FOREIGN PATENT DOCUMENTS

| EP | 1953977 | * | 6/2008 |
| KR | 1020030069299 A | | 8/2003 |
| KR | 1020070000807 A | | 1/2007 |

OTHER PUBLICATIONS

International Search Report for PCT/KR2009/007787 filed on Dec. 24, 2009.

(Continued)

*Primary Examiner* — Kwang B Yao
*Assistant Examiner* — Harun Chowdhury

(57) ABSTRACT

The present invention relates to an apparatus and a method for scheduling multiple bursts containing a collaborative spatial multiplexing (CSM) burst and a non-CSM burst in a broadband radio communication system. The method comprises the steps of packet-scheduling an uplink data packet corresponding to the bandwidth request from a terminal such that the packet is allocated to either the CSM burst or the non-CSM burst, determining a modulation and coding scheme (MCS) level and a transmission power level corresponding to the packet-scheduled uplink data packet using the maximum number of bytes for each MCS level in accordance with the types of the multiple bursts calculated for the terminal, determining a transmission power offset in accordance with the type of the burst to which the packet-scheduled uplink data packet is allocated using the MCS level and the power transmission level determined in the previous step, and generating MAP information for the terminal, containing burst allocation information of the uplink data packet and information of the transmission power offset determined in the previous step.

13 Claims, 5 Drawing Sheets

(51) Int. Cl.
*H04W 52/14* (2009.01)
*H04W 52/22* (2009.01)
*H04W 52/26* (2009.01)

(56) References Cited

U.S. PATENT DOCUMENTS

2006/0034382 A1 2/2006 Ozluturk et al.
2008/0008113 A1* 1/2008 Cho et al. .................... 370/318
2008/0037464 A1* 2/2008 Lim et al. .................... 370/329
2008/0186915 A1* 8/2008 Kim et al. .................... 370/329
2009/0186621 A1* 7/2009 Umeda et al. ................ 455/446
2010/0208685 A1* 8/2010 Kim et al. .................... 370/329
2010/0208687 A1* 8/2010 Lim et al. .................... 370/329
2010/0254292 A1* 10/2010 Kim et al. .................... 370/311

OTHER PUBLICATIONS

Written Opinion for PCT/KR2009/007787 filed on Dec. 24, 2009.

* cited by examiner

APPARATUS AND METHOD FOR SCHEDULING IN A BROADBAND RADIO COMMUNICATION SYSTEM

TECHNICAL FIELD

The present invention relates generally to an apparatus and method for scheduling in broadband wireless communication system, and more particularly to an apparatus and method for scheduling uplink (hereinafter, referred to as 'UL') bursts in broadband wireless communication system.

BACKGROUND ART

Research on the next-generation communication system is being conducted to provide users with various QoS (Quality of Service) services at a high data rate.

As a scheme for using wireless resource efficiently, MIMO (Multiple Input Multiple Output) technology that can separate channels in space by using multiple transmission antennas and multiple reception antennas has been proposed. The MIMO system can obtain maximum N times channel capacity gain as compared with one antenna system, by transmitting different signals through N antennas having space-separated channels on same time and frequency resource.

Meanwhile, as an applied scheme of the MIMO technology, CSM (Collaborative Spatial Multiplexing) technology that constructs a virtual MIMO environment by assuming multiple terminals to one terminal using multiple antennas in UL frame has been proposed. Specifically, in the CSM technology, multiple terminals simultaneously transmit UL data packets to a base station (hereinafter, referred to as 'BS') having multiple antennas through same wireless resource, and the BS receive MIMO signals (i.e. UL data packets) from multiple terminals.

In case of applying the CSM scheme, since multiple terminals transmit signals through same wireless resource, a required CINR (Carrier to Interference and Noise Ratio) of a CSM burst is set higher than that of other burst (hereinafter, referred to as 'non-CSM burst') that dose not use the CSM scheme.

However, in conventional wireless communication system, there is no way that the BS can inform control information about proper required CINR to a terminal which will transmit the CSM burst. Therefore, there is a demand for new scheduling scheme that can meet the required CINR for the CSM burst in case that a mobile station (hereinafter, referred to as 'MS') does not have transmission power information for the CSM burst.

DISCLOSURE

Technical Problem

Therefore, the present invention has been made in view of the above-mentioned demands, and it is an object of the present invention to provide an apparatus and method for UL scheduling to increase transmission rate of UL data packet in accordance with information of the MS in broadband wireless communication system.

It is another object of the present invention to provide an apparatus and method for UL scheduling by using UL data packet information, transmission power information, and UL CINR of the MS in broadband wireless communication system.

It is further another object of the present invention to provide an apparatus and method for UL scheduling the multi-bursts allocated to the MS in CSM based data transmission in broadband wireless communication system.

Technical Solution

According to one aspect of the present invention, there is provided an apparatus for scheduling multi-bursts in broadband wireless communication system, the apparatus comprising: a packet scheduler for scheduling an uplink data packet corresponding to a bandwidth request from a terminal such that the uplink data packet is allocated to the multi-bursts; an operation part for determining a transmission power offset in accordance with the type of the burst to which the scheduled uplink data packet is allocated; and a generation part for generating MAP information containing burst allocation information and transmission power offset information for the uplink data packet.

According to another aspect of the present invention, there is provided a method for scheduling multi-bursts in broadband wireless communication system, the method comprising: scheduling an uplink data packet corresponding to a bandwidth request from a terminal such that the uplink data packet is allocated to either the CSM (Collaborative Spatial Multiplexing) burst or the non-CSM burst; determining a MCS (Modulation and Coding Scheme) level and a transmission power level corresponding to the scheduled uplink data packet by using maximum allowable bytes for each MCS level in accordance with the types of the multi-bursts for the terminal; determining a transmission power offset in accordance with the type of the burst to which the scheduled uplink data packet is allocated, by using the determined MCS level and the power transmission level; and generating MAP information containing burst allocation information and transmission power offset information for the uplink data packet.

According to further another aspect of the present invention, there is provided a base station in broadband wireless communication system, wherein the base station sets an uplink data packet in accordance with a bandwidth request from a terminal, allocates burst for the uplink data packet according to CSM (Collaborative Spatial Multiplexing) scheme or non-CSM scheme, determines a transmission power offset corresponding to a type of the burst to which the uplink data packet is allocated, and performs an uplink scheduling by using the transmission power offset.

Advantageous Effects

The present invention can increase the transmission rate of UL data packet and increase the usage efficiency of the restricted resources by performing UL scheduling of the MS by using UL data packet information, transmission power information, and UL CINR of the MS in CSM based data transmission.

In particular, the present invention can increase the transmission rate of data through the restricted resources by dynamically controlling the UL resource allocation, MCS level, and transmission power level for the bursts for CSM based data packet transmission/reception by using UL data packet information, transmission power information, and UL CINT of the MS.

Also, the present invention can easily perform the scheduling for multi-bursts which are allocated to the MS in same time interval.

DESCRIPTION OF THE DRAWINGS

The above and other aspects, features and advantages of the present invention will become more apparent from the following detailed description when taken in conjunction with the accompanying drawings in which.

MODE FOR INVENTION

Figure 1:
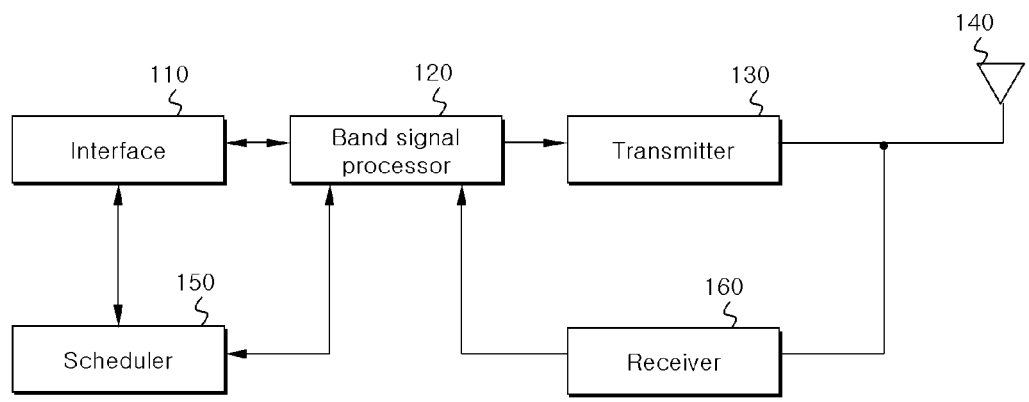
FIG. 1 is a diagram illustrating a structure of a BS in broadband wireless communication system according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

FIG. 1 is a diagram illustrating a structure of a BS in broadband wireless communication system according to an embodiment of the present invention.

For reference, regarding FIG. 1, the present invention will be described based on the IEEE (Institute of Electrical and Electronics Engineers) 802.16 communication system that employs OFDM (Orthogonal Frequency Division Multiplexing)/OFDMA (Orthogonal Frequency Division Multiple Access) scheme, as an example of the broadband wireless communication system.

Also, regarding FIG. 1, the BS according to the present invention allocates multi-bursts to the MS by applying CSM scheme.

Referring to FIG. 1, the BS according to the present invention includes an interface 110 which processes data in transmission/reception of data, a band signal processor 120 which performs modulation/demodulation and encoding/decoding for data, a transmitter 130 which transmits the modulated and encoded data to the MS, a receiver 160 which receives data from the MS, a scheduler 150 which performs the scheduling for data transmission/reception in downlink (hereinafter, referred to as 'DL') and UL, and an antenna 140 which transmits and receives data with the MS through the air.

In UL path, the receiver 160 receives one or more radio signals that terminals transmit, via the antenna 140, and converts the received radio signals into baseband signals. For example, the receiver 160 removes noises from the received signals, amplifies the noise-removed signals, down-converts the amplified signals into baseband signals, and digitalizes the down-converted baseband signals.

Also, the receiver 160 transmits UL CINR and NI (Noise and Interference) to the scheduler 150, wherein the UL CINR is measured for the UL data packet from the MS and the NI occurs between adjacent cells in multi-cells environment. The receiver 160 receives transmission power report message containing total transmission power information, current transmission power information, and allowable transmission power information from the MS, and sends the transmission power report message to the scheduler 150.

The band signal processor 120 extracts information or data bits from the digitalized signals, and performs demodulation, decoding, error correction processes thereon. The information or data bits which go through these processes are sent to adjacent wired/wireless networks via the interface 110 or transmitted again to other MSs being served by the BS through transmission path.

In DL path, the interface 110 receives voice, data and/or control information from a base station controller or radio network, and the band signal processor 120 encodes the voice, data and/or control information and outputs the results to the transmitter 130. The transmitter 130 modulates the encoded voice, data and/or control information with carrier signals having a desired transmission frequency or frequencies, amplifies the modulated carrier signals to a level suitable for transmission, and transmits the amplified carrier signals over the air via the antenna 140.

Meanwhile, the scheduler 150 controls each process and element in DL and UL.

In particular, the scheduler 150 according to the present invention calculates maximum allowable bytes for each MCS level according to types of the multi-bursts by using MS information, UL channel information, and multi-bursts information received from the MS, and determines the MCS level and the transmission power level for the current scheduled data packet of the MS by using the maximum allowable bytes.

Also, the scheduler 150 generates the MAP information containing multi-burst zone information, MCS level and transmission power level information, and transmission power offset information, and transmits the MAP information to the MS.

Herein, the multi-bursts include a burst (hereinafter, referred to as 'CSM burst') that transmits data packet with the CSM scheme and a burst (hereinafter, referred to as 'non-CSM burst') that transmits data packet without the CSM scheme, according to whether the CSM scheme is applied in data transmission between the BS and the MS. Also, the multi-bursts include a burst (hereinafter, referred to as 'HARQ burst') that transmits data packet through the HARQ supportable connection to which the CSM scheme and non-CSM scheme can be applied and a burst (hereinafter, referred to as 'normal burst') that transmits data packet through the HARQ non-supportable connection to which the CSM scheme and non-CSM scheme can be applied.

Hereinafter, with reference to FIG. 2, an apparatus for UL scheduling in wireless communication system according to an embodiment of the present invention will now be described.

Figure 2:
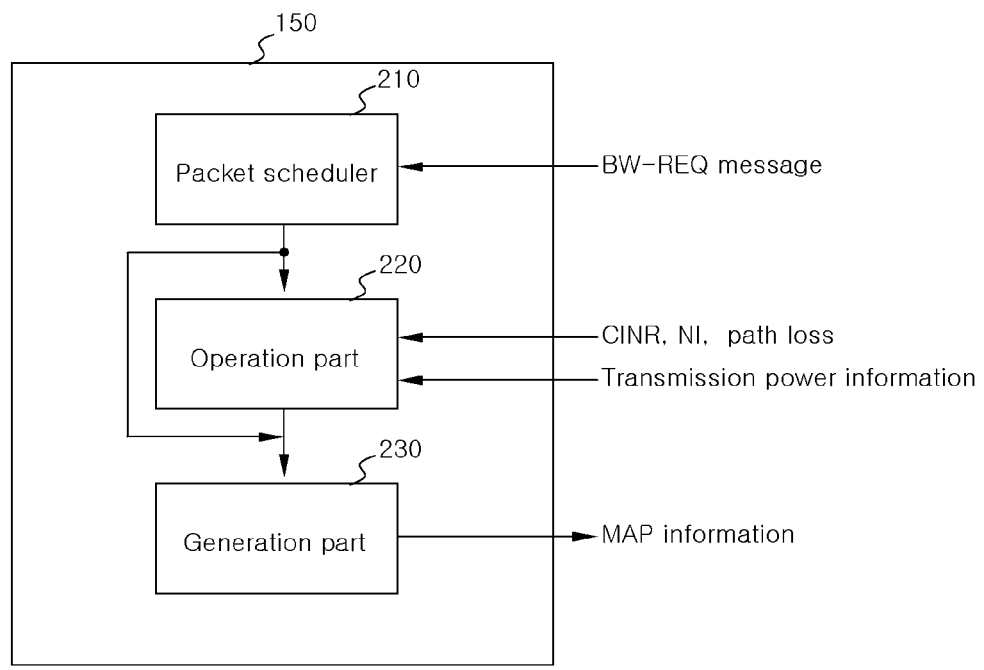
FIG. 2 is a diagram illustrating a structure of a scheduler according to an embodiment of the present invention.

FIG. 2 is a diagram illustrating the structure of the scheduler 150 of FIG. 1.

Referring to FIG. 2, the scheduler 150 according to the present invention includes a packet scheduler 210 that performs the packet scheduling for the UL data packet of the MS, an operation part 220 that determines the MCS level and transmission power level for the MS, and a generation part 230 that generates the MAP information containing scheduling information about the MCS level and transmission power level, etc.

The packet scheduler 210 checks BW-REQ (Bandwidth Request) message, if the receiver 160 receives BW-REQ message requesting UL resource allocation for the transmission of the UL data packet from the MS.

Then, the packet scheduler 210 checks information about the UL data packet that the MS will transmit through the BW-REQ message, and performs the packet scheduling for the UL data packet of the MS. Herein, the information about the UL data packet includes UL data packet size, burst type, connection type, service type, etc.

Specifically, the packet scheduler 210 stores information about at least one UL data packet for which bandwidth allocation has been requested according to the reception order of bandwidth request from the MS, checks the connection type and the service type included in the UL data packet information, and performs packet scheduling based on the priority order of the UL data packet. In this case, the scheduler 210 determines whether to perform paring for the UL data packet or not, and perform packet scheduling so that the UL data packet can be allocated to the CSM burst or the non-CSM burst.

Thereafter, packet scheduler 210 transmits information about the packet scheduled UL data packet to the operation part 220. Herein, the information about the packet scheduled UL data packet includes packet size information of the UL data packet and burst type information that indicates whether the UL data packet is allocated to the CSM burst or the non-CSM burst.

The operation part 220 determines the transmission power offset of the current scheduled UL data packet by using parameters acquired from the transmission power report and UL data packet information. Herein, the parameters include normalized CINR, normalized transmission power, transmission power density for each MCS level, and maximum allowable bytes for the UL data packet.

Specifically, the operation part 220 receives and checks the UL CINR and transmission power report from the MS. In this case, the operation part 220 checks total transmission power, current transmission power, and available transmission power of the MS through the transmission power report.

Then, the operation part 220 calculates the normalized transmission power for the CSM burst and/or the non-CSM burst received from the MS by using the UL CINR and transmission power level of the MS, and calculates capacity for the CSM burst and/or the non-CSM burst by using the normalized transmission power.

Specifically, the operation part 220 checks the burst type (i.e. CSM burst or non-CSM burst) and checks a relative offset in accordance with the MCS level corresponding to the burst type (a CSM relative offset in accordance with the MCS level). The CSM relative offset in accordance with the MCS level indicates an offset value for power control of CSM type burst based on the MCS level. For example, the operation part 220 checks a HARQ relative offset or a CSM relative offset according to the burst type.

Then, the operation part 220 calculates the normalized CINR by using the relative offset according to the burst type, and calculates the normalized transmission power level by using the normalized CINR. Thereafter, the operation part calculates the capacity for the CSM burst or the non-CSM burst by using the normalized transmission power level. For reference, the operation part 220 calculates transmission power density for each MCS level for the CSM burst or the non-CSM burst as the capacity, and calculates the number of the available total sub-channels and maximum allowable bytes for each MCS level according to the burst type by using the transmission power density for each MCS level and the available transmission power (i.e. total remained power) of the MS.

For reference, the available MCS levels for the UL data packet are QPSK (Quadrature Phase Shift Key) 1/2 with repetition 6, QPSK 1/2 with repetition 4, QPSK 1/2 with repetition 2, QPSK 1/2, QPSK 3/4, 16 QAM (Quadrature Amplitude Modulation) 1/2, 16 QAM 3/4, etc.

The operation part 220 generates a resource table for the MCS level and transmission power level information for the burst received from the MS and the total remained power and the capacity information.

Meanwhile, the operation part 220 determines proper MCS level and transmission power level for the UL data packet that is scheduled by the packet scheduler 210, referring to the resource table, and transmits Power Control IE (Information Element) containing the transmission power offset information corresponding to the determined MCS level to the generation part 230.

Then, the generation part 230 generates MAP information containing the burst allocation information of the MS (i.e. information about the size and the position of the UL data packet that the MS will transmit). The generation part 230 generates MAP IE containing the MCS level and transmission power level information and the transmission power offset information for the multi-bursts allocated to the MS, and transmits the MAP IE to the MS.

Hereinafter, with reference to FIG. 3, the operation part 220 in broadband wireless communication system according to an embodiment of the present invention will now be described.

Figure 3:
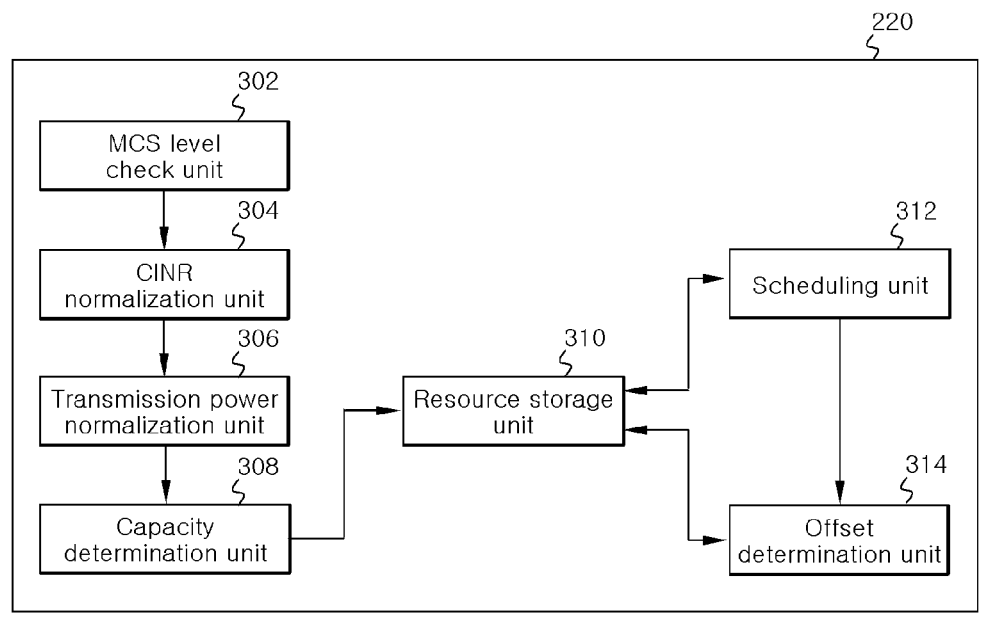
FIG. 3 is a diagram illustrating a structure of an operation part according to an embodiment of the present invention.

FIG. 3 is a diagram illustrating the structure of the operation part 220 of FIG. 2.

Referring to FIG. 3, the operation part 220 according to the present invention includes an MCS level check unit 302 that checks the MCS level for the multi-bursts received from the MS, a CINR normalization unit 304 that calculates the normalized CINR for the multi-bursts, a transmission power normalization unit 306 that calculates the normalized transmission power level for the multi-bursts, a capacity determination unit 308 that determines the capacity (e.g. the number of the available total sub-channels, the maximum allowable bytes) for the multi-bursts, a resource storage unit 310 that stores capacity information for the multi-bursts, a scheduling unit 312 that allocates the multi-bursts to the UL data packet, and an offset determination unit 314 that determines the transmission power offset for the allocated multi-bursts.

The MCS level check unit 302 obtains information for the burst that the MS transmits through UL and checks the MCS level for the burst.

The CINR normalization unit 304 calculates the normalized CINR for the burst by normalizing the UL CINR measured by the BS with the reference MCS level (e.g. QPSK 1/2). In this case, the CINR normalization unit 304 calculates the normalized CINR for the burst by further using the relative offset for the HARQ burst and/or the CSM burst according to whether to apply the HARQ scheme and/or the CSM scheme.

For reference, the normalized CINR calculated by the CINR normalization unit 304 indicates a CINR that is normalized on the basis of required CINR corresponding to the reference MCS level. For example, the normalized CINR can be calculated by the following Equation 1.

$$NCINR_{norm\_dB}[k] = \{CINR_{dB}[k] - HARQ\_Offs - Off_{M\_CSM\_MCS}\} - \left\{(C/N[k] - C/N_{QPSK1/2}) - 10\log\frac{R[k]}{R_1}\right\}$$ [Equation 1]

In Equation 1, $NCINR_{norm\_dB}[k]$ denotes a normalized CINR with dB scale for the $k^{th}$ burst received from the MS. In this case, $NCINR_{norm\_dB}[k]$ is a normalized CINR on the basis of the non-CSM burst. $CINR_{dB}[k]$ denotes a measured CINR with dB scale for the $k^{th}$ burst. HARQ_Offs denotes a HARQ relative offset for the measured burst. Herein, if the measured burst is not HARQ burst, HARQ_Offs is set to '0'.

Also, $Off_{M\_CSM\_MCS}$ denotes a CSM relative offset for the measured burst. Herein, if the measured burst is not CSM burst, $Off_{M\_CSM\_MCS}$ is set to '0'. C/N[k] denotes a required CINR for the MCS level that is applied to the $k^{th}$ burst, and $C/N_{QPSK1/2}$ denotes a required CINR for the QPSK 1/2. R[k] denotes a repetition count of the MCS level corresponding to the $k^{th}$ burst, and $R_1$ denotes a repetition of the reference MCS level (i.e. QPSK 1/2), and is set to '1'.

The transmission power normalization unit 306 checks the transmission power level for the burst through the transmission power report message reported from the MS, and calculates the normalized transmission power level for the burst by using the checked transmission power level, the relative offset according to the burst type, and the normalized CINR.

Herein, the normalized transmission power level for the transmission power level reported from the MS can be calculated by the following Equations 2 and 3.

$$NTP_{TPR} = TPR + (C/N_{QPSK1/2} - C/N_{MCS\_TPR}) + 10 \log 10(R_{MCS\_TPR}) - (HARQ\_Offs + Off_{CSM\text{-}MCS\_TPR}) \quad \text{[Equation 2]}$$

In Equation 2, $NTP_{TPR}$ denotes a valid normalized transmission power level for the transmission power reported from the MS. Herein, TRP denotes transmission power level reported from the MS, and can be obtained from the header of the transmission power report message that the MS transmits. $C/N_{QPSK1/2}$ denotes a required CINR for the QPSK 1/2, and $C/N_{MCS\_TPR}$ denotes a required CINR (i.e. normalized CINR) for the burst that carries the bandwidth request and the transmission power report message header. Also, $R_{MCS\_TPR}$ denotes a repetition count for the MSC level of the burst that carries the bandwidth request and the transmission power report message header. $Off_{CSM\text{-}MCS\_TPR}$ denotes a CSM relative power offset for the MCS level of the transmission power report message header. Herein, if the burst is not CSM burst, $Off_{CSM\text{-}MCS\_TPR}$ is set to '0'.

$$NTP = NTP_{valid} + Off_{N\text{-}CSM} \quad \text{[Equation 3]}$$

In Equation 3, NTP denotes a normalized transmission power. In this case, $NTP_{valid}$ denotes a valid normalized transmission power level, i.e. $NTP_{TPR}$ calculated by Equation 2, and $Off_{N\text{-}CSM}$ denotes a filtered offset, i.e. a offset based on the non-CSM burst.

The capacity determination unit 308 calculates the transmission power density for each MCS level according to the types of the multi-bursts by using the normalized transmission power level determined by transmission power normalization unit 306. In this case, the capacity determination unit 308 can calculate the transmission power density corresponding to the MCS level of the burst by using the following Equation 4.

$$P_{MCS} = NTP + (C/N_{MCS} - C/N_{QPSK1/2}) - 10 \log_{10} R_{MCS} + (HARQ\_Offs + Off_{CSM\text{-}of\text{-}MCS}) \quad \text{[Equation 4]}$$

In Equation 4, $P_{MCS}$ denotes a transmission power density corresponding to the MCS level. $C/N_{MCS}$ denotes a required CINR corresponding to the MCS level, and $R_{MCS}$ denotes a repetition count corresponding to the MCS level. $Off_{CSM\text{-}of\text{-}MCS}$ denotes a relative power offset of the CSM burst corresponding to the MCS level. Herein, if the burst is not CSM burst, $Off_{CSM\text{-}of\text{-}MCS}$ is set to '0'.

The capacity determination unit 308 calculates the number of the available total sub-channels by using the transmission power density calculated by Equation 4, and determines the maximum allowable bytes for each MCS level according to the types of the multi-bursts by using the calculated sub-channels. Herein, the number of the available total sub-channels can be calculated by the following Equation 5, and the maximum allowable bytes can be determined by using the following Equation 6.

$$SCh_{Total} = \min\left[SCh_{Zone}, \left\lfloor \frac{10^{\left(\frac{TP_{rem} - P_{MCS}}{10}\right)}}{SCar_{subchannel}} \right\rfloor\right] \quad \text{[Equation 5]}$$

In Equation 5, $SCh_{Total}$ denotes the number of the available total sub-channels, and $SCh_{Zone}$ denotes the number of the total sub-channels at associated zone. For reference, in 1024 FFT (Fast Fourier Transform), $SCh_{Zone}$ is set to '35'. $TP_{rem}$ denotes a current available total transmission power (i.e. remained total transmission power) of the MS, and $SCar_{Subchannel}$ denotes the number of sub-carriers per sub-channel.

$$MB_{MCS} = SCh_{Total} \times (D_{slot\_per\_SC}) \times (B_{per\_Slot\_MCS}) \quad \text{[Equation 6]}$$

In Equation 6, $MB_{MCS}$ denotes the maximum allowable bytes for the burst, $D_{slot\_per\_SC}$ denotes the number of data slots per sub-channel in associated zone, and $B_{per\_slot\_MCS}$ denotes bytes per slot for the MCS level.

The capacity determination unit 308 transmits the maximum allowable bytes for each MCS level according to the types of the multi-bursts, which are calculated by Equations 5 and 6, to the resource storage unit 310.

The resource storage unit 310 stores the maximum allowable bytes for each MCS level and the number of slots for the maximum allowable bytes, as the resource table. Thereby, the scheduling unit 312 determines the MCS level corresponding to the maximum allowable bytes appropriate for the allocated burst, by using the resource table.

Also, the resource storage unit 310 stores burst allocation information for the current scheduled UL data packet from the scheduler unit 312, as the resource table.

The scheduler unit 312 selects the MCS level and the transmission power level for the current scheduled UL data packet, by using the maximum allowable bytes and the number of slots according to the types of the multi-bursts. In this case, the scheduler unit 312 determines an appropriate MCS level and transmission power level by considering the size information of the current scheduled UL data packet and the maximum allowable bytes for each MSC level.

The scheduler unit 312 performs scheduling by allocating resources for the current scheduled UL data packet based on the determined MCS level and transmission power level. That is, the scheduler unit 312 allocates resources for the current scheduled UL data packet by using the number of the bytes of the current scheduled UL data packet and the number of the bytes per slot corresponding to the determined MCS level.

Also, the scheduler unit 312 updates the resource table with the determined MCS level and transmission power level and the number of the allocated slots for the current scheduled UL data packet, as the burst allocation information, and transmits the scheduling information to the generation part 230.

The offset determination unit 314 checks the determined MCS level for the current scheduled UL data packet, and determines the transmission power offset based on the determined MCS level. In this case, if the current scheduled UL data packet is allocated to the CSM burst, the offset determination unit 314 can determine the transmission power offset for the current scheduled UL data packet by using the relative offset corresponding to the MCS level for the CSM burst that the MS uses in previous frame, which is stored in the resource storage unit 310.

For example, the offset determination unit 314 can calculate the transmission power offset for the current scheduled UL data packet by using the following Equation 7.

$$\text{Off}_{MCS} = \text{Off}_{N\text{-}CSM} + (\text{Off}_{CSM\_of\_MCS} - \text{PrevOff}_{CSM\_of\_MCS}) \quad \text{[Equation 7]}$$

In Equation 7, $\text{Off}_{MCS}$ denotes a transmission power offset of the MCS level for the burst (e.g. CSM burst, non-CSM burst) to which the current scheduled UL data packet is allocated, that is, a final offset that will be encoded into Power Control IE. $\text{Off}_{N\text{-}MCs}$ denotes a filtered offset, that is, an offset corresponding to the MCS level on the basis of non-CSM burst. $\text{PrevOff}_{CSM\_of\_MCS}$ denotes a relative offset of the CSM burst corresponding to the MCS level for the CSM burst that is scheduled in previous frame. $\text{Off}_{CSM\_of\_MCS}$ denotes a relative offset of the CSM burst corresponding to the MCS level for the CSM burst that is scheduled in current frame. Herein, if the burst is not CSM burst, $\text{Off}_{CSM\_of\_MCS}$ is set to '0'. The offset corresponding to the current scheduled UL data packet is stored in the resource storage unit 310 after completing scheduling for the current frame.

Then, the offset determination unit 314 transmits information about the determined transmission power offset to the generation part 230.

Hereinafter, with reference to FIGS. 4 and 5, a method for generating a resource table for UL scheduling and a method for UL scheduling in broadband wireless communication system according to an embodiment of the present invention will now be described.

Figure 4:
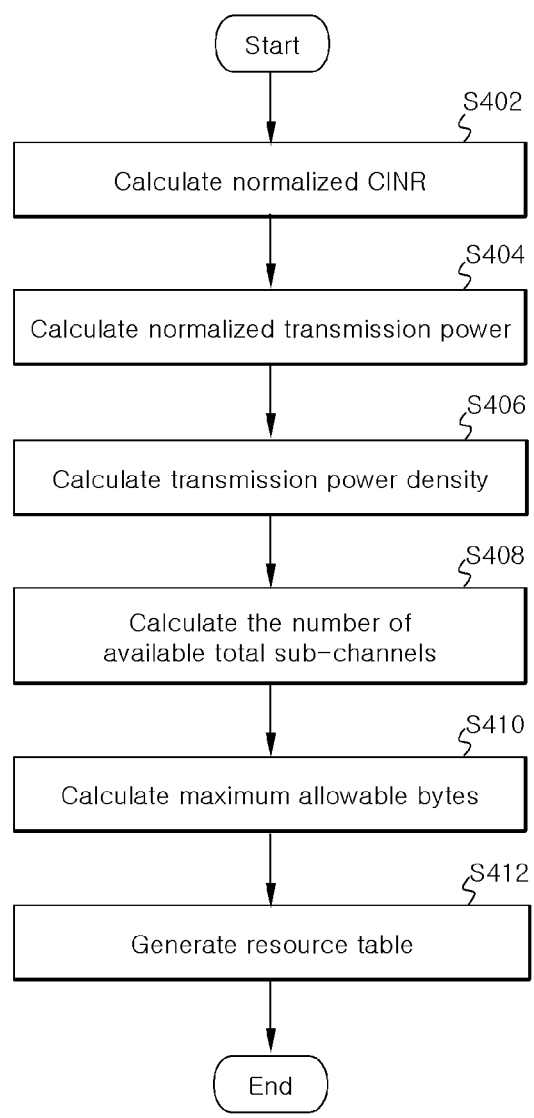
FIG. 4 is a flowchart illustrating a method for generating a resource table for UL scheduling in which a scheduler controls the UL scheduling according to an embodiment of the present invention.

FIG. 4 is a flowchart illustrating a method for generating the resource table for UL scheduling according to an embodiment of the present invention.

Referring to FIG. 4, in Step S402, the scheduler calculates the normalized CINR by using the MCS level and the UL CINR for the UL burst that the MS transmits. In this case, the scheduler calculates the normalized CINR by using the relative offset corresponding to the UL burst type (e.g. CSM burst, non-CSM burst). For reference, the normalized CINR can be calculated by Equation 1.

In Step S404, the scheduler calculates the normalized transmission power level for the UL burst by using the normalized MCS level. In this case, the scheduler calculates the normalized transmission power level by using the relative power offset corresponding to the UL burst type and the transmission power level included in the transmission power report that the MS reports for the UL burst. For reference, the normalized transmission power level can be calculated by Equations 2 and 3.

In Step S406, the scheduler calculates the transmission power density for the UL burst in corresponding MCS level by using the normalized transmission power level. In this case, the scheduler can calculate the transmission power density for each MCS level by calculating the transmission power density corresponding to the MCS level, by using the normalized transmission power level. Also, when the scheduler calculates the transmission power density for each in MCS level, the scheduler can calculate the MCS level and transmission power density for each burst type by using the relative power offset according to the burst type. For reference, the transmission power density corresponding to the MCS level can be calculated by Equation 4.

In Step S408, the scheduler calculates the number of the available total sub-channels corresponding to each burst type and MCS level by using the transmission power density and total remained power that is included in the transmission power report from the MS. For reference, the number of the available total sub-channels can be calculated by Equation 5.

In Step S410, the scheduler calculates the maximum allowable bytes corresponding to each burst type and MCS level by using the number of the available total sub-channels. In this case, the scheduler can calculate the maximum allowable bytes corresponding to each burst type and MCS level by using the number of slots per sub-channel in allocated zone and the number of bytes per slot corresponding to each MCS level. For reference, the maximum allowable bytes can be calculated by Equation 6.

In Step S412, the scheduler generates and stores the resource table for the maximum allowable bytes corresponding to each burst type and MCS level. The resource table can be referred in determination of the MCS level and the transmission power level for the UL data packet that will be scheduled later.

Figure 5:
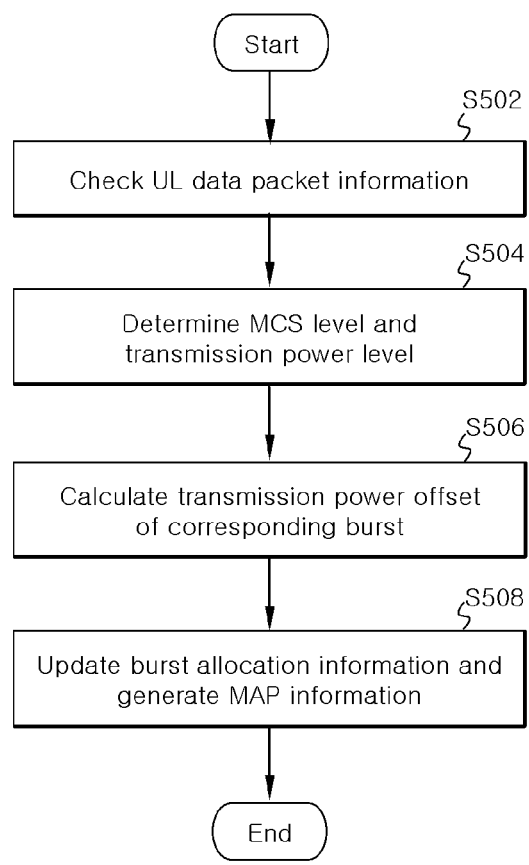
FIG. 5 is a flowchart illustrating a method for UL scheduling according to an embodiment of the present invention.

FIG. 5 is a flowchart illustrating the method for UL scheduling according to an embodiment of the present invention.

For reference, the method illustrated in FIG. 5 relates to the burst allocation method after packet scheduling according to the service priority order and the connection for the UL data packet that is scheduled in UL frame according to BW-REQ message from the MS.

In Step S502, the scheduler checks information about the current scheduled UL data packet. In this case, the scheduler checks the type (e.g. CSM burst or non-CSM burst) and size of the burst to which the UL data packet is allocated.

In Step S504, the scheduler determines the MCS level and the transmission power level that are applied to the UL data packet, by using the UL data packet information. In this case, the scheduler determines the MCS level and the transmission power level by using the resource table that stores the maximum allowable bytes corresponding to each burst type and MCS level. For example, the scheduler checks the maximum allowable bytes for each MCS level corresponding to the burst type of the UL data packet, and determines the MCS level to be applied to the UL data packet by comparing the maximum allowable bytes for each MCS level and the size of the UL data packet.

In Step S506, the scheduler calculates the transmission power offset corresponding to the burst type of the UL data packet by using the determined MCS level and transmission power level. In this case, if the burst type of the UL data packet is the CSM burst, the scheduler calculates the transmission power offset by using the relative offset of the CSM burst that is scheduled for the same MS in previous frame and the relative offset of the CSM burst corresponding to the determined MCS level. For reference, the transmission power offset can be calculated by Equation 7.

Lastly, in Step S508, the scheduler updates the transmission power offset by using the relative offset of the CSM burst in previous frame, and generates MAP information containing the transmission power offset and burst information for the UL data packet.

While the invention has been shown and described with reference to a certain preferred embodiment thereof, it will be understood by those skilled in the art that various changes in form and details may be made therein without departing from the spirit and scope of the invention as defined by the appended claims.

The invention claimed is:
1. An apparatus for scheduling multi-bursts in broadband wireless communication system, the apparatus comprising:
   a packet scheduler for scheduling such that an uplink data packet corresponding to a bandwidth request from a terminal is allocated to an uplink burst from among the multi-bursts;

an operation part for determining a transmission power offset in accordance with a type of the uplink burst to which the uplink data packet is allocated, wherein the uplink burst is classified into a CSM (Collaborative Spatial Multiplexing) burst type or a non-CSM burst type; and a generation part for generating MAP information containing information on the transmission power offset for the uplink data packet, wherein the operation part determines the transmission power offset by using a first CSM relative offset corresponding to a MCS (Modulation and Coding Scheme) level of the uplink data packet that is scheduled and a second CSM relative offset corresponding to a MCS level that is applied to a CSM burst of previous frame, and wherein the operation part determines the transmission power offset by using the following equation:

$$\text{Off}_{MCS} = \text{Off}_{N\text{-}CSM} + (\text{Off}_{CSM\ of\ MCS} - \text{prevOff}_{CSM\ of\ MCS}),$$

where $\text{Off}_{MCS}$ denotes the transmission power offset, $\text{Off}_{N\text{-}CSM}$ denotes an offset corresponding to the MCS level of the uplink data packet on the basis of non-CSM burst, $\text{Off}_{CSM\ of\ MCS}$ denotes the first CSM offset, and $\text{prevOff}_{CSM\ of\ MCS}$ denotes the second CSM burst.

2. The apparatus of claim 1, wherein the operation part determines the MCS level corresponding to the scheduled uplink data packet based on maximum allowable bytes for each of MCS levels in accordance with the type of the uplink burst, and determines the transmission power offset corresponding to the determined MCS level in accordance with the type of uplink burst to which the scheduled uplink data packet is allocated.

3. The apparatus of claim 1, wherein the operation part comprises:
a capacity determination unit for calculating a transmission power density and maximum allowable bytes for each MCS level corresponding to types of the multi-bursts by using a predetermined normalized transmission power corresponding to a previously received uplink burst;
a scheduling unit for determining the MCS level and the transmission power level corresponding to the uplink data packet that will be scheduled, by using the maximum allowable bytes for each MCS level; and
an offset determination unit for determining the transmission power offset corresponding to the determined MCS level in accordance with the types of the uplink burst to which the uplink data packet is allocated.

4. The apparatus of claim 3, wherein the operation part further comprises:
a CINR normalization unit for calculating a normalized CINR by using at least one of the MCS level that is applied to the previously received uplink burst, the CINR, and the second CSM relative offset corresponding to the applied MCS level; and
a transmission power normalization unit for calculating a normalized transmission power level for the previously received uplink burst by using at least one of a current transmission power corresponding to the previously received uplink burst, the normalized CINR, and the second CSM relative offset corresponding to the MCS level that is applied to the previously received uplink burst.

5. The apparatus of claim 1, wherein the CSM burst type includes a CSM based normal burst type and a CSM based HARQ burst type, and the non-CSM burst type includes a non-CSM based normal burst type, and a non-CSM based HARQ burst type.

6. The apparatus of claim 1, wherein the operation part sets the first CSM relative offset to a value 0 when the uplink burst is classified into the non-CSM burst type.

7. A method for scheduling multi-bursts in broadband wireless communication system, the method comprising:
scheduling such that an uplink data packet corresponding to a bandwidth request from a terminal is allocated to either a CSM (Collaborative Spatial Multiplexing) burst or a non-CSM burst;
determining a MCS (Modulation and Coding Scheme) level and a transmission power level corresponding to the uplink data packet based on maximum allowable bytes for each of MCS levels in accordance with a type of the uplink burst for the terminal;
determining a transmission power offset in accordance with the type of the uplink burst to which the uplink data packet is allocated, by using the determined MCS level and the power transmission level; and
generating MAP information containing information on the transmission power offset for the uplink data packet,
wherein the transmission power offset is determined by using a first CSM relative offset corresponding to the determined MCS level of the uplink data packet and a second CSM relative offset corresponding to a MCS level that is applied to a CSM burst of previous frame, and
wherein the transmission power offset is determined by using the following equation:

$$\text{Off}_{MCS} = \text{Off}_{N\text{-}CSM} + (\text{Off}_{CSM\ of\ MCS} - \text{prevOff}_{CSM\ of\ MCS}),$$

where $\text{Off}_{MCS}$ denotes the transmission power offset, $\text{Off}_{N\text{-}CSM}$ denotes an offset corresponding to the MCS level of the uplink data packet on the basis of non-CSM burst, $\text{Off}_{CSM\ of\ MCS}$ denotes the first CSM offset, and $\text{prevOff}_{CSM\ of\ MCS}$ denotes the second CSM burst.

8. The method of claim 7, prior to the step of determining the MCS level and the transmission power level, further comprising:
calculating the maximum allowable bytes for each of MCS levels in accordance with the types of the uplink burst, by using information on a previously received uplink burst, transmission power information, and predetermined uplink CINR (Carrier to Interference and Noise Ratio).

9. The method of claim 8, wherein the step of calculating the maximum allowable bytes comprises:
calculating a normalized CINR for the uplink burst by using the MCS level applied to the previously received uplink burst and the CINR for the previously received uplink burst;
calculating a normalized transmission power by using the normalized CINR and a current transmission power corresponding to the previously received uplink burst; and
calculating a transmission power density per each MCS level in accordance with the types of the multi-bursts by using the normalized transmission power, and the maximum allowable bytes corresponding to the transmission power density.

10. The method of claim 8, wherein the step of calculating the maximum allowable bytes comprises:

calculating a normalized CINR and a normalized transmission power by the second CSM relative offset corresponding to the MCS level and the type of the previously received uplink burst.

11. The method of claim 7, wherein the step of determining the transmission power offset comprises:
setting the first CSM relative offset to a value 0 when the uplink burst is classified into the non-CSM burst type.

12. A base station in broadband wireless communication system,
wherein the base station sets an uplink data packet in accordance with a bandwidth request from a terminal, allocates uplink burst for the uplink data packet according to CSM (Collaborative Spatial Multiplexing) scheme or non-CSM scheme, determines a transmission power offset corresponding to a type of the uplink burst to which the uplink data packet is allocated, and performs an uplink scheduling by using the transmission power offset, wherein the uplink burst is classified into a CSM burst type or a non-CSM burst type,
wherein the transmission power offset is determined by using a first CSM relative offset corresponding to a MCS level of the uplink data packet that is scheduled and a second CSM relative offset corresponding to a MCS level that is applied to a CSM burst of previous frame, and
wherein the base station determines the transmission power offset by using the following equation:

$$\text{Off}_{MCS} = \text{Off}_{N\text{-}CSM} + (\text{Off}_{CSM\ of\ MCS} - \text{prevOff}_{CSM\ of\ MCS}),$$

where $\text{Off}_{MCS}$ denotes the transmission power offset, $\text{Off}_{N\text{-}CSM}$ denotes an offset corresponding to the MCS level of the uplink data packet on the basis of non-CSM burst, $\text{Off}_{CSM\ of\ MCS}$ denotes the first CSM offset, and $\text{prevOff}_{CSM\ of\ MCS}$ denotes the second CSM burst.

13. The base station of claim 12, wherein the base station sets the first CSM relative offset to a value 0 when the uplink burst is classified into the non-CSM burst type.

* * * * *